United States Patent [19]
McMullan et al.

[11] 4,270,820
[45] Jun. 2, 1981

[54] ELECTRIC COMPONENT CABINET

[76] Inventors: James P. McMullan; Albert Stevens, both of 2630 Seaman Ave., El Monte, Calif. 91733

[21] Appl. No.: 22,192

[22] Filed: Mar. 20, 1979

[51] Int. Cl.³ .................. H02B 1/00; A47B 43/00
[52] U.S. Cl. ........................ 312/242; 312/257 A; 312/263; 312/351; 361/380; 361/399
[58] Field of Search ............... 312/242, 263, 351, 320, 312/257 SK, 257 A; 361/380, 386, 395, 399, 422

[56] References Cited

U.S. PATENT DOCUMENTS

| 3,279,871 | 10/1966 | Bright | 312/351 |
| 3,347,608 | 10/1967 | Ritchie | 312/263 |
| 3,623,784 | 11/1971 | Neufeld | 312/263 |
| 3,779,177 | 12/1973 | Gigante | 312/257 A |
| 3,901,571 | 8/1975 | Begitschke et al. | 312/351 |
| 3,917,757 | 11/1975 | Hoag | 312/263 |
| 3,997,820 | 12/1976 | Stefani | 361/380 |
| 4,034,871 | 7/1977 | Jorgensen | 361/399 |
| 4,109,294 | 8/1978 | Mason et al. | 361/399 |

Primary Examiner—Victor N. Sakran
Attorney, Agent, or Firm—Georges A. Maxwell

[57] ABSTRACT

An elongate fabricated box-like cabinet for electrical apparatus comprising like horizontal top and bottom walls, like vertical end walls, and vertical front and rear control and service panels; the top and bottom walls have vertically spaced opposing inner surfaces with laterally spaced longitudinal flanged projections thereon defining vertically opening longitudinal grooves and horizontally opening longitudinal channels disposed toward the channels of adjacent projections; the vertical panels have upper and lower edge portions releasably engaged in the foremost and rearmost grooves in the top and bottom walls; the end walls have axially inwardly disposed surfaces engaged with opposing ends on the top and bottom walls and overlying the ends of the panels; the end walls have axially inwardly projecting retaining flanges engaging the inner surfaces of the top and bottom walls and the inner surfaces of said panels; the end walls carry screw fasteners engaged in the ends of related grooves defined by the projections on the top and bottom walls to releasably secure the cabinet parts in assembled relationship; the flanged projections within the cabinet provide mounting structure for electrical parts and components within the cabinet.

5 Claims, 8 Drawing Figures

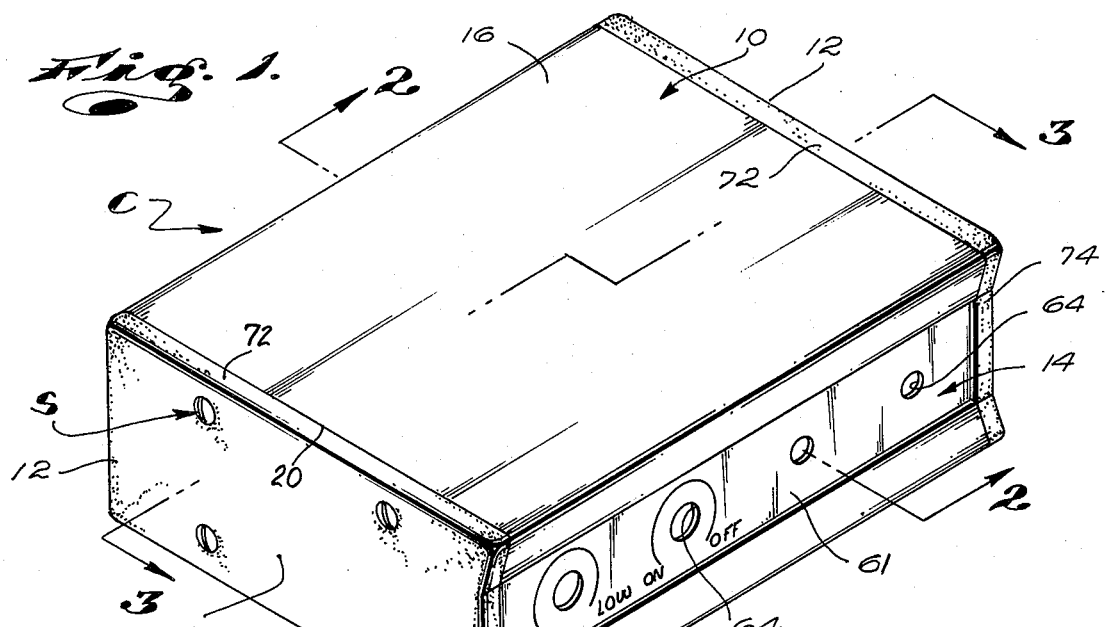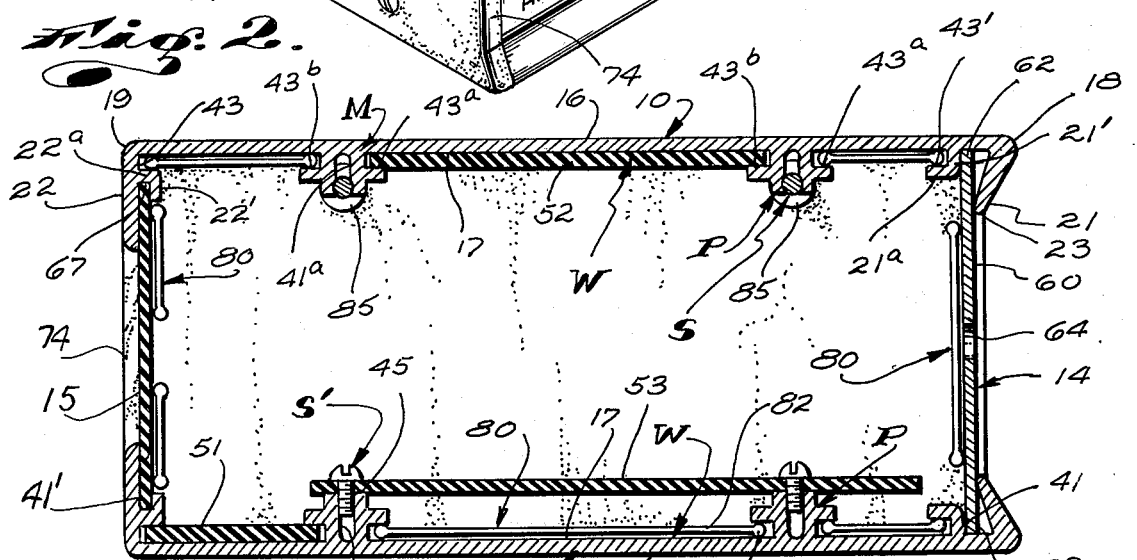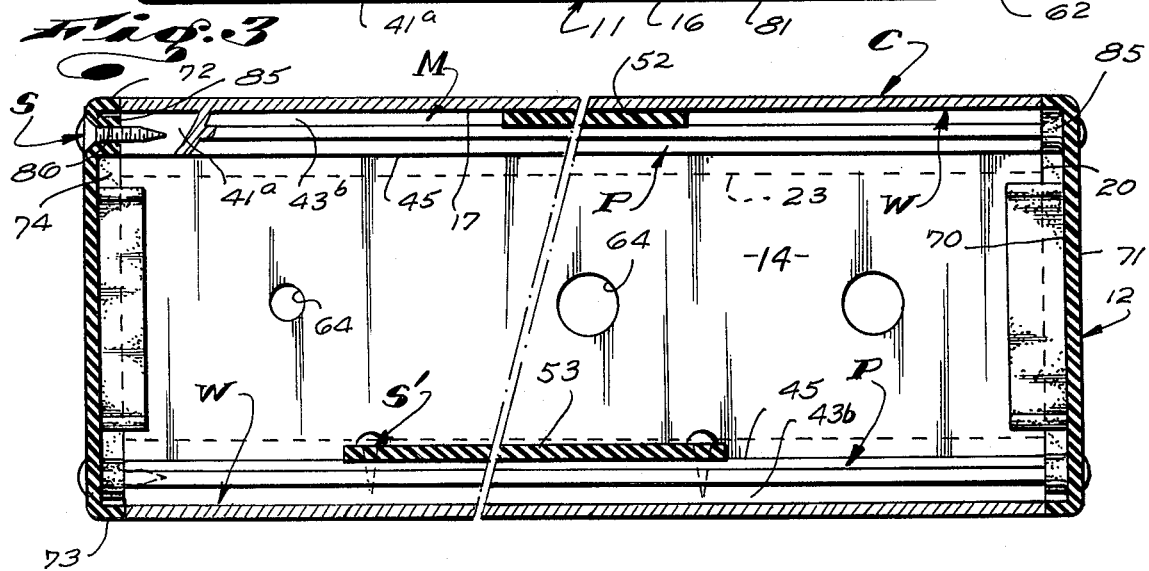

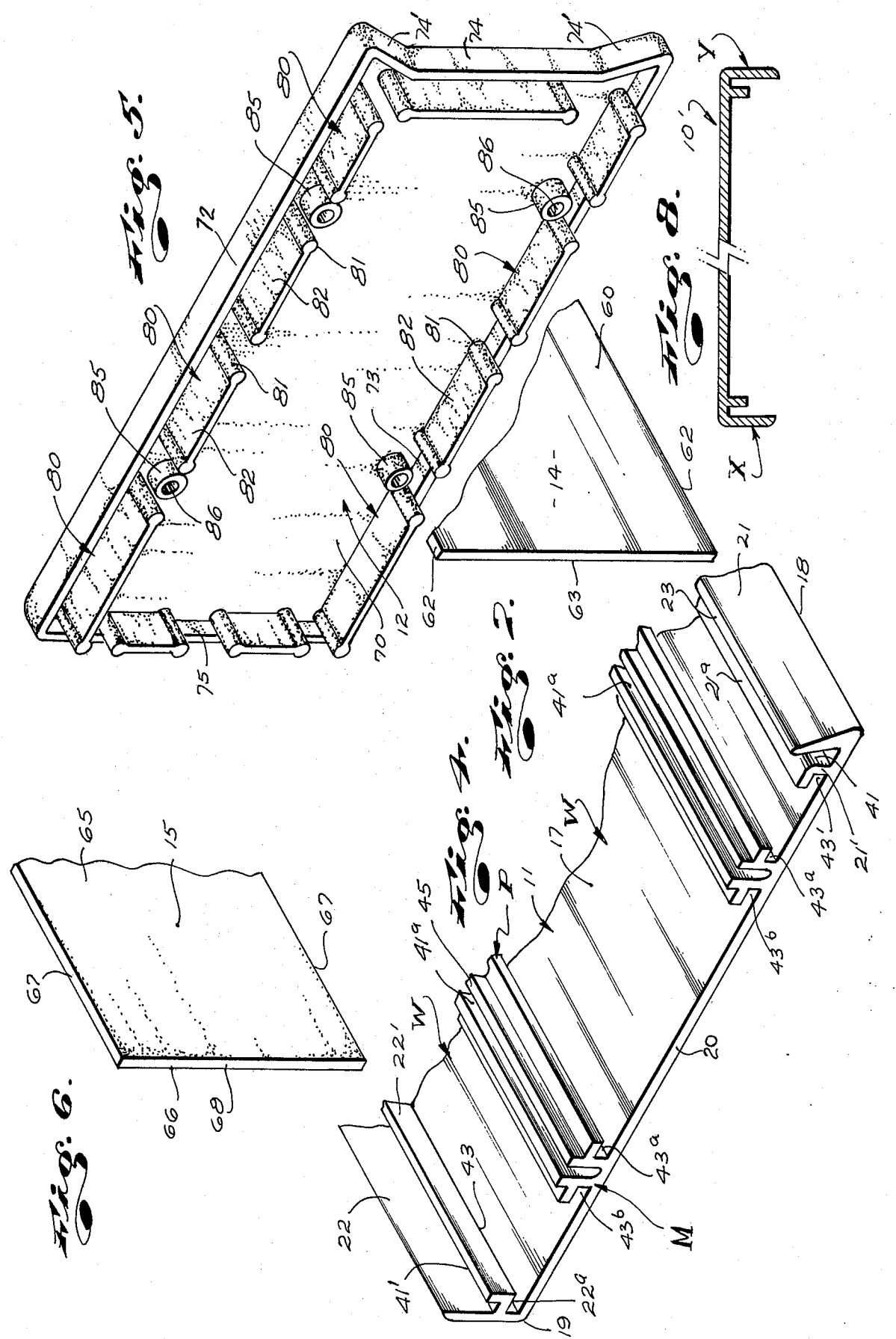

ELECTRIC COMPONENT CABINET

This invention has to do with a cabinet and is particularly concerned with an improved and novel cabinet structure for supporting and housing electric apparatus.

In the electrical and/or electronics industry, cabinets must be provided to suitably support and house electrical apparatus comprising circuit boards and related electrical components. The cabinets are required to shield and protect the apparatus and/or protect the environment in which the apparatus is to be used, from adverse effects which might be experienced if the apparatus was exposed. Additionally, cabinets are provided for their aesthetic values.

With the advent of transistors and unitized circuitry, there has been a notable increase in the number of cabinetized electrical devices made available to the public. Further, as a result of miniaturization of electrical circuits and their components, the vast majority of new electrical devices are rather small or compact and can be effectively housed in rather small cases or cabinets.

Most small electrical devices provided for and sold to the public are provided with electrical service cords, couplings or receptacles and with control panels at which one or more manually engageable and manually operable control knobs, buttons, levers and the like are made readily visible and accessible. It is not infrequent that the power cord, couplings or receptacles, manually operable control knobs, buttons, levers and the like, required for cabinetized electric devices are the largest and/or most space consuming parts of the devices and dictate the minimum practical size of the cabinets for the devices. For example, it is not infrequent that an electrical circuit measuring no more than 1"×2"×3" will require the provision of three or four manually operable knobs measuring from ½" to ¾" in diameter arranged lineally along a single control panel and spaced no less than 1½" apart. In such a case, it will be apparent that the cabinet for such a circuit must be at least 9" long to present or accommodate a control panel of sufficient size and must be otherwise dimensionally proportioned to afford a structurally stable, sound and aesthetically balanced unit.

The most common and widely used forms of cabinets for small electrical devices are custom fabricated wooden box structures with service and control panel receiving openings therein; drawn or fabricated metal cannisters or box-like cabinets with suitable closure panels and the like; and custom molded plastic box-like structures with appropriate service and control panels secured thereto and/or formed integrally therewith. Wooden cabinets are commonly ordered and fabricated to specification and are costly. Such cabinets are oftentimes of questionable structural soundness and generally require costly cosmetic finishing. Molded plastic types of cabinet structures require extremely costly dies and are only suitable for use in those situations where the electrical devices are to be mass-produced in a number of different standard sizes for distribution and use throughout the electronics and electrical art by the manufacturers of electrical devices. While standard sizes of metal cabinets are readily available, at reasonable cost, they are aesthetically least desirable and are oftentimes of questionable structural soundness.

There has been a long recognized want and need for a standardized electrical device cabinet structure which is such that a manufacturer of one or a plurality of electrical devices of different sizes can, with a minimum inventory of stock and/or parts, easily and economically fabricate cabinets of different and special sizes to accommodate and satisfy the requirements for one or more of his different electrical products or devices.

An object and feature of our invention is to provide a fabricated box-like cabinet having like opposing vertical end walls, horizontal top and bottom walls of like cross-section, and vertical front and rear panels of similar cross-section.

It is an object and feature of our invention to provide a cabinet of the general character referred to above wherein the several walls and panels have interengaging parts and/or portions to normally maintain related parts and portions of the construction in predetermined assembled relationship with each other and a container wherein the several walls and panels are releasably fixed in assembled relationship by a predetermined minimal number of screw fasteners carried by the end walls and engaging portions of the top and bottom walls.

Yet another object and feature of our invention is to provide a cabinet structure of the general character referred above wherein the top and bottom walls and the front and rear panels can be cut from elongate lengths of wall and panel stock whereby cabinets of substantially any suitable, desired length can be established, as desired and as circumstances require.

Still another object and feature of our invention is to provide a cabinet structure of the character referred to above wherein the like horizontal, longitudinally extending, top and bottom walls have flat, unobstructed outside surfaces, flat inside surfaces and laterally spaced longitudinally extending vertical projections of novel cross-section adapted to cooperatively receive and support circuit boards and various electrical components to be housed within and carried by the cabinet and with which screw fasteners can be cooperatively engaged to maintain the cabinet assembled and the electrical components and parts in fixed position therein.

It is another important object and feature of our invention to provide a cabinet structure of the general character referred to above wherein the top and/or bottom wall of the cabinet establish electrical chassis, which can be easily and conveniently worked upon during mounting and assembly of an electrical circuit or apparatus to be housed and which can thereafter be easily, simply and quickly cooperatively related and assembled with other parts of the cabinet.

The foregoing feature of the present invention distinguishes our new cabinet from all those cabinets provided by the prior art which are especially made or must be modified or worked upon to accommodate preestablished electrical chassis and the like and upon which the electrical devices are preassembled.

Another important object and feature of our invention is to provide a cabinet of the general character referred to above which is notably more rigid, durable and structurally more sound than are those cabinets of similar size and cost, provided by the prior art.

Finally, it is an object and feature of our invention to provide a cabinet structure of the character referred to which is neat and attractive.

The foregoing and other objects and features of our invention will be fully understood from the following detailed description of one typical preferred embodiment of our invention, throughout which description reference is made to the accompanying drawings.

DESCRIPTION OF THE DRAWINGS

FIG. 1 is an isometric view of a cabinet embodying our invention;

FIG. 2 is an enlarged cross-sectional view taken as indicated by line 2—2 on FIG. 1;

FIG. 3 is an enlarged sectional view taken as indicated by line 3—3 on FIG. 1;

FIG. 4 is an enlarged isometric view of a portion of the bottom wall, showing the front, side and one end thereof;

FIG. 5 is an enlarged isometric view showing the front, top and inside of one end wall;

FIG. 6 is an isometric view of a portion of the rear panel, showing the top, inside and one end thereof;

FIG. 7 is an isometric view of a portion of the front panel, showing the top, inside and one end thereof; and, FIG. 8 is a view of a portion of a modified form of our invention.

DETAILED DESCRIPTION OF THE INVENTION

Referring to the drawings, the cabinet C that we provide is a fabricated box-like unit and includes top and bottom walls 10 and 11, end walls 12 and front and rear panels 14 and 15.

The top and bottom walls 10 and 11 are like, flat, horizontal, rectilinear parts having flat outer surfaces 16 (disposed outward relative to the interior of the cabinet) substantially flat inner surfaces 17 (disposed inwardly relative to the interior of the cabinet), straight longitudinally extending front and rear edges 18 and 19 and straight laterally extending opposite end edges 20.

The front and rear edges 18 and 19 of the like, top and bottom walls 10 and 11 are defined by front and rear longitudinally extending projections including longitudinally extending inwardly projecting front and rear flanges 21 and 22.

The front flanges 21 are straight and flat and are angularly related to the horizontal planes of said walls to extend rearwardly at an angle of about 30°. The flanges 22 have radiused inner edges 23 which occur tangent with the vertical plane of the cabinet on which the front surface of the front panel 14 occurs.

The outside corners establishes by the outer surfaces 16 and flanges 21 are radiused and the flanges 21 are inclined, as illustrated, for aesthetic reasons.

The rear flanges 22 are straight, flat, vertical flanges. The inner or forwardly disposed surfaces of the flanges 22 occur on a common vertical plane with the outer or rearwardly disposed surfaces of the rear panel 15.

In addition to the above, the front and rear projections on the walls 10 and 11 have or include longitudinally extending, vertical keeper flanges 21' in predetermined spaced relationship rearward of the edges 23 of the flanges 21 and longitudinally extending vertically keeper flanges 22' in predetermined spaced relationship forward of the flanges 22. The keeper flanges 21' and 22' cooperate with those related flanges 21 and 22 to define vertically inwardly opening longitudinal grooves 41 and 41'. The flanges 21' and 22' are positioned to occur on common planes with and to engage the inside surfaces of the front and rear panels 14 and 15.

The flanges 21' are formed integrally with and project inwardly from the inner surfaces 17 of the walls 10 and 11 (in close proximity with the flanges 21). The flanges 22' are L-shaped projections and have rearwardly extending bases 22$^a$ which are integrally joined with the inside or forwardly disposed surfaces of the rear flanges 22, whereby the keeper flanges 22' are spaced vertically relative to the inner surfaces 17 and cooperate therewith to define longitudinally extending forwardly opening channels 43, the purpose of which will hereinafter be described.

The walls 10 and 11 next include novel mounting means M to facilitate the mounting of electrical circuit boards, components and the like on those walls and which impart into each of those walls the characteristics of an electrical chassis.

The mounting means M includes a plurality of elongate longitudinally extending, laterally spaced, parallel flanged projections P on and projecting inwardly from the inner surfaces 17 of the walls 10 and 11, spaced laterally between the front and rear projections which define the grooves 41 and 41'. The flanged projections define both vertically opening grooves and horizontally, forwardly and rearwardly opening channels 43$^a$ and 43$^b$ coextensive with the walls. The flanged projections and the channels and grooves defined thereby are adapted to cooperatively receive and hold orienting flanges on the end walls 12, which will hereinafter be described; cooperatively receive screw fastener means for securing the several walls together; cooperatively support and/or receive and hold the edge portions and the like of circuit boards and/or the mounting flanges or plates for electrical components. The subject flanged projections also serve to cooperatively receive screw fasteners for securing such boards, flanges and plates in position within the cabinet.

More specifically, the flanged projections on each of the walls 10 and 11 define spaced, parallel inwardly opening longitudinally extending grooves 41$^a$ which are parallel with and in vertical spaced opposing relationship with like grooves 41$^a$ defined by the flanged projections on the other of said walls and into which the upper and lower edges of flat vertically disposed longitudinally extending panel or circuit boards can be slidably engaged and supported within the cabinet and into which screw fasteners S and S' can be cooperatively engaged, as will hereinafter be described.

Additionally, the flanged projections of the means M cooperate with the inner surfaces 17 of the walls 10 and 11 to define horizontal, longitudinally extending laterally forwardly and rearwardly opening channels 43$^a$ and 43$^b$ in which related edges of circuit boards 51 and 52 or the like are or can be slidably engaged and retained.

In the preferred form and carrying out of the invention, the aforementioned channels 43 defined by the rear projections comprising the flanges 22, keeper flanges 22' and inner surfaces of the walls 10 and 11 are the rearmost, forwardly opening channels of the means M.

The keeper flanges 21' along the forward portions of the walls 10 and 11 have longitudinally extending rearwardly projecting flange-like legs 21$^a$ along their inner edges. The legs 21$^a$ are in spaced vertical parallel relationship with the surfaces 17 of the walls and cooperate therewith to define the foremost, rearwardly opening longitudinally extending channels 43' of the means M.

In the form of the invention illustrated, each wall 10 and 11 has two flanged projections P. The projections P have central vertical ribs with flat inwardly disposed longitudinally extending supporting edges 45 and are split or divided, vertically and longitudinally, to define the vertically opening longitudinally extending grooves 41$^a$. The ribs have flat longitudinally extending front and rear sides or surfaces from which flange like legs project to occur in vertical spaced relationship from the surfaces 17 of the walls and which cooperate therewith to define the channels 43$^a$ 43$^b$. The rearmost projection P is in spaced opposing relationship with the forwardly opening rearmost groove 43; the forwardly opening groove 43$^a$, defined by the foremost projection P is in spaced opposing relationship with the rearwardly opening foremost groove 43' and the forwardly opening groove 43$^a$ of the rearmost projection P is spaced from and opposes the rearwardly opening groove 43$^b$ of the foremost projection P, as clearly illustrated in FIGS. 2 and 4 of the drawings.

With the above relationship of parts, it will be apparent that the inner surfaces 17 of the top and bottom walls are divided into three longitudinally extending way-like portions W defined by the noted opposing longitudinally extending pairs of opposing related channels 43–43$^b$, 43$^a$–43$^b$, and 43$^a$–43', and that circuit boards and/or the mounting flanges or plates for electrical components which have at least one dimension which substantially corresponds with the lateral space between related pairs of opposing channels can be engaged with and between those grooves and securely retained thereby adjacent the inside surface 17 of the wall related thereto.

The above relationship of parts is clearly illustrated in FIG. 2 of the drawings wherein the flat plate-like parts 51 and 52 are shown engaged in and between related pairs of opposing channels and retained thereby, adjacent the inside surfaces 17 of the walls 10 and 11. The plate-like parts 51 and 52 can be circuit boards, mounting plates for circuit boards or other electrical components, or can be mounting flanges of electrical components.

It will be apparent that the longitudinally extending way-like portions W. defined by related pairs of opposing channels and the portions of the inner surface 17 of the wall 10 between those channels, open longitudinally outwardly at the opposite ends 20 of the walls 10 and 11 whereby the board or plate-like parts engaged therein can be easily and conveniently slid longitudinally inwardly and into retained engagement therein from either end of the walls, prior to assembly of the cabinet.

It will be apparent that the several vertical longitudinally extending projections on the walls 10 and 11 are stiffening members and impart into those walls great structural strength and/or stiffness.

It will also be apparent that the cross-section of the walls 10 and 11 is such that they are particularly suitable to being established by extruding processes and can be easily and economically made of plastic or metal, such as an alluminum alloy.

Further, extruded wall stock of considerable or great longitudinal extent can be economically produced and made available whereby pairs of top and bottom walls of any desired length can be easily and conveniently cut for the convenient and economical establishment of many different and special sizes of cabinets.

In practice, and as shown in FIG. 2 of the drawings, flat horizontal circuit boards 53 can be effectively mounted on one or both of the walls 10 and 11 in vertical spaced relationship with the inner surfaces 17 thereof. In FIG. 2 of the drawings, a board 53 is arranged to extend across and between the projections P of the wall 10 in supported engagement with the edges 45 of those projections and is releasably secured in fixed relationship therewith by screw fasteners S' carried by the board and engaged in the grooves 41$^a$ of the projections. The fasteners S' are self-tapping fasteners which are slightly greater in diametric extent than the width of grooves 41$^a$ whereby they effectively bite into the stock of the projections defining the opposite sides of the grooves 41$^a$.

It is to be noted that the grooves 41$^a$ effectively pilot the fasteners S' into engagement in the projections P and that they allow for substantially infinite longitudinal positioning of the board 53 along the wall 10; thereby imparting great flexibility or latitude as regards the longitudinal positioning of such boards within the resulting cabinet.

The front control panel 14 is an elongate straight flat ribbon-like plate of suitable metal or plastic. The panel 14 is vertically disposed; has flat forwardly and rearwardly disposed inner and outer surfaces 60; straight upper and lower longitudinally extending upper and lower edge portions 62; and straight vertical end portions 63. The panel 14 is substantially equal in vertical extent with the vertical distance between the opposing inner surfaces 17 of the top and bottom walls 10 and 11 and is substantially equal in thickness with the minor width of the grooves 41 in the walls 10 and 11 and defined by the edges 23 of the flanges 21 and the flanges 21'. The panel 14 is slightly longer in longitudinal extent than the walls 10 and 11.

The panel 14 is arranged between the forward edges of the walls 10 and 11 with its upper and lower edge portions 62 slidably engaged in and retained by the grooves 41 of the walls 10 and 11 and with its vertical end portions 63 projecting a limited distance from the opposite ends of the walls 10 and 11.

The panel 14, in accordance with common practice is provided with through openings or apertures 64 to accommodate and/or through which shafts and the like for manually operable control devices (not shown), within the cabinet, can freely project for ready access at the front exterior of the cabinet. The number, size and placement of the apertures 64 can be varied as desired and as circumstances require.

The panel 14 is cut from an elongate strip of panel stock and can be made in many different lengths as circumstances require.

The rear service panel 15, like the front panel 14, is cut from an available elongate strip of rear panel stock. The panel 15 has flat vertical forwardly and rearwardly disposed inner and outer surfaces 65 and 66; straight horizontal longitudinally extending upper and lower edge portions 67; and straight vertical end edge portions 68.

The panel 15, like the panel 14, is slightly longer than the walls 10 and 11; is substantially equal in vertical extent with the vertical distance between the bottoms of the opposing rear grooves 41' in the walls 10 and 11; and is substantially equal in thickness with the grooves 41'.

The panel 15 is arranged between the rear edges of the walls 10 and 11 with its upper and lower edge portions 67 slidably engaged in and retained by the grooves 41', with its end edge portions 68 projecting from the opposite ends of the walls 10 and 11.

The panel 15 can be provided with through openings (not shown) to accommodate power cord receptacles and other components and parts of electrical devices housed by the cabinet, as desired, or as circumstances require.

The end walls 12 of my new cabinet C are like molded plastic or cast metal parts with flat longitudinally inwardly and outwardly disposed inner and outer end surfaces 70 and 71. The walls 12 have straight, longitudinally inwardly projecting top, bottom, front and rear flanges 72, 73, 74 and 75 about their perimeters. The flanges 72, 73, 74 and 75 define flat inwardly disposed edges or surfaces which occur on common vertical planes with the vertical planes on which the edges 20 of the top and bottom walls 10 and 11 and on which the ends of the flanges 21 and 22 occur whereby the outside surfaces of the flanges on the end walls occur on substantially common planes with the outer surfaces 16 of the walls 10 and 11 and of the flanges 21 and 22, when the end walls are arranged adjacent the ends of the walls 10 and 11, as clearly illustrated in FIGS. 1 and 3 of the drawings.

With the above structure and relationship of parts, it will be apparent that the portions of the front and rear flanges 74 and 75 on the end walls 12 which extend or bridge the space between the front and rear flanges 21 and 22 of the walls 10 and 11, occur outward of and overlie the end edge portions 63 and 68 of the front and rear panels 14 and 15, which extend a limited distance beyond the ends of the walls 10 and 11.

It is to be noted that the front flanges 74 of the end walls 12 have inclined upper and lower portions 74' to cooperate with the inclined front flanges 21 of the walls 10 and 11, as clearly illustrated in FIGS. 2 and 5 of the drawings.

In addition to the foregoing, the end walls 12 are provided with or have a plurality of horizontal retaining flanges 80 which project longitudinally inwardly from the inner surfaces 70 of the end walls in spaced parallel relationship with the upper and lower flanges 72 and 73 and projecting longitudinally inwardly into the end portions of the ways W defined by the inner surfaces 17 and the projections P of the walls 10 and 11. In the preferred carrying out of the invention and as shown in FIG. 5 of the drawings, the retaining flanges 80 have enlarged radiused end portions 81 which establish snug sliding engagement in the end portions of their related channels 43, 43', 43$^a$ and 43$^b$ and have thin web portions 82 between the noted enlarged portions 81.

Finally, the end walls 12 have a plurality (4) of longitudinally inwardly projecting cylindrical bosses 85 with central fastener receiving through openings 86. The openings 86 are aligned with and oppose the longitudinally outwardly opening ends of the grooves 41$^a$ in the projections P of the walls 10 and 11. The openings 86 accommodate and carry the head end portions of self-tapping screw fasteners S, accessible at the exterior of the walls 12. The shank portions of the fasteners S enter and establish threaded engagement with the projections P, at the opposing surfaces of the grooves 41$^a$, as clearly shown in the drawings.

With the top and bottom walls, front and rear panels and with the end walls assembled as noted above and with the end walls screw-fastened to the top and bottom walls as noted, it will be apparent that the resulting cabinet C is an extremely rugged, structurally sound and durable structure.

It will also be apparent that the cabinet C is extremely easy to assemble and disassemble.

In the preferred carrying out of this invention, the bottom and/or top walls 10 and 11 are used as a chassis upon which the electric devices to be housed within the cabinet are assembled, prior to assembly of the cabinet. Thereafter, the panels 14 and 15 are arranged with the top and/or bottom walls 10 and 11. Next, the top wall (or bottom wall) is moved into engagement with the panels 14 and 15. Finally, the end walls are moved into engagement with the assembled top and bottom walls and with their related panels 14 and 15 and are screw fastened to the top and bottom walls, as noted above.

The above procedure of assembly is extremely simple, requires little skill and/or time and lends itself to extremely effective and efficient assembly line practices.

In the form of the invention disclosed above, the front and rear sides of the cabinet C are dissimilar in configuration and the front and rear panels are of different vertical extent. In practice, and as shown in FIG. 8 of the drawings, the front and rear portions X and Y of the top and bottom walls 10' of the cabinet can be alike and such that the front and rear panels would be similar in vertical extent and such that they could be established of or from common panel stock.

Having described only typical preferred forms and applications of our invention, we do not wish to be limited to the specific details herein set forth but wish to reserve to ourselves any modifications and/or variations that may appear to those skilled in the art and which fall within the scope of the following claims.

Having described our invention, we claim:

1. An elongate box-like cabinet for electrical devices comprising like vertically spaced longitudinally extending horizontal top and bottom walls, like longitudinally spaced vertical end walls and vertical, laterally spaced longitudinally extending front and rear panels, said like top and bottom walls have vertically spaced opposing inner surfaces with vertical inwardly projecting longitudinally extending front, rear and laterally spaced intermediate flanged projections, the flanged projections define longitudinally outwardly and vertically opening grooves, a pair of adjacent flanged projections on the top and bottom walls define horizontally opening and opposing longitudinal channels defining longitudinally outwardly and inwardly opening ways at the inner surfaces of the top and bottom walls, said vertical longitudinally extending front and rear panels have upper and lower edge portions slidably engaged in and retained by related opposing grooves in the front and rear flanged projections on the top and bottom walls, said like vertical end walls have longitudinally inwardly disposed inner surfaces in stopped engagement with opposing related ends of the top and bottom walls, longitudinally inwardly projecting retaining flanges engaged with the inner surfaces of said top and bottom walls and screw fasteners carried by the end walls and threadedly engaged into the ends of the grooves in said intermediate projections on said top and bottom walls, said intermediate flanged projections have inwardly disposed supporting edges to support parts arranged within the cabinets, said grooves in the intermediate flanged projections accommodate mounting parts and fastening means for parts arranged within the cabinet, said channels cooperatively receive mounting parts for electrical components and parts positioned within the cabinet between the projections.

2. The cabinet structure set forth in claim 1 wherein each of the flanged projections defines a horizontal channel disposed towards its next adjacent flanged projection to define a plurality of laterally spaced parallel ways extending longitudinally of the inner surfaces of the top and bottom walls.

3. The cabinet set forth in claim 1 wherein the retaining flanges on the end walls occur within the end portions of said ways and have portions engaged in and retained by the ends of the channels.

4. The cabinet set forth in claim 2 wherein the retaining flanges on the end walls occur within the end portions of said ways and have portions engaged in and retained by the ends of the channels.

5. An elongate box-like cabinet for electrical devices comprising like vertically spaced longitudinally extending horizontal top and bottom walls, like longitudinally spaced vertical end walls and vertical laterally spaced longitudinally extending front and rear panels, said top and bottom walls have vertically spaced opposing inner surfaces with vertically inwardly projecting longitudinally extending front and rear flange-like projections defining longitudinally extending longitudinally outwardly and vertically opening grooves and laterally spaced intermediate projections with longitudinally outwardly disposed surfaces substantially coplanar with the ends of those walls, said vertical longitudinally extending front and rear panels have inner and outer surfaces and have upper and lower horizontal edge portions slidably engaged in and retained by related opposing grooves in said front and rear projections on the top and bottom walls, said like vertical end walls have longitudinally inwardly disposed inner surfaces in stopped engagement with opposing related ends of the top and bottom walls and overlie the open ends of the grooves and the ends of said panels and have longitudinally inwardly projecting retaining flanges engaged with the inner surfaces of said top and bottom walls and said panels and screw fasteners carried by the end walls and threadedly engaged into the intermediate projections on the top and bottom walls.

* * * * *